(12) United States Patent
Levitsky et al.

(10) Patent No.: US 10,447,366 B2
(45) Date of Patent: Oct. 15, 2019

(54) TECHNIQUES FOR RECEPTION BEAM REFINEMENT

(71) Applicant: QUALCOMM Incorporated, San Diego, CA (US)

(72) Inventors: Michael Levitsky, Petah Tikva (IL); Ran Berliner, Kfar-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/875,443

(22) Filed: Jan. 19, 2018

(65) Prior Publication Data

US 2018/0269947 A1    Sep. 20, 2018

Related U.S. Application Data

(60) Provisional application No. 62/471,188, filed on Mar. 14, 2017.

(51) Int. Cl.
*H04B 7/06* (2006.01)
*H04L 5/00* (2006.01)
(Continued)

(52) U.S. Cl.
CPC ......... *H04B 7/0617* (2013.01); *H04B 7/0626* (2013.01); *H04B 7/0695* (2013.01);
(Continued)

(58) Field of Classification Search
CPC ... H04W 16/28; H04W 72/085; H04W 24/10; H04W 24/02; H04B 7/0617; H04B 7/0695; H04B 7/088; H04B 17/101; H04B 17/309; H04B 17/318; H04B 7/0408; H04B 7/0413; H04B 7/0452; H04B 7/0626; H04L 1/0026; H04L 5/005; H04L 25/0224
See application file for complete search history.

(56) References Cited

U.S. PATENT DOCUMENTS

| 10,003,446 B2 * | 6/2018 | Yu ........................ H04L 5/0053 |
| 2013/0065540 A1 * | 3/2013 | Takano ................ H04B 7/0617 |
| | | 455/68 |

(Continued)

FOREIGN PATENT DOCUMENTS

| WO | WO2017146759 A1 | 8/2017 |
| WO | WO2017152931 A1 | 9/2017 |

*Primary Examiner* — Khanh C Tran
(74) *Attorney, Agent, or Firm* — Holland & Hart LLP

(57) ABSTRACT

Techniques for synchronized reception beam refinement are described herein. A base station may indicate to a user equipment (UE) a time when a reception beam refinement event may occur. The UE may initiate a synchronized reception beam refinement procedure based on receiving the indication from the base station. The UE may identify a new reception beam configuration based on data stored locally by the UE and ongoing background calculations that the UE carries out based on periodic beam reference signals. At the time indicated, the UE may adjust the reception beam configuration of a reception beam. The base station may initiate one or more link maintenance procedures based on a reception beam refinement event occurring. Such techniques may reduce the loss of data due to link degradation related to channel state feedback inconsistency (CSF) after a reception beam refinement event.

30 Claims, 13 Drawing Sheets

(51) Int. Cl.
    *H04L 25/02*     (2006.01)
    *H04B 7/08*     (2006.01)

(52) U.S. Cl.
    CPC ............ *H04B 7/088* (2013.01); *H04L 5/005* (2013.01); *H04L 25/0224* (2013.01)

(56) References Cited

U.S. PATENT DOCUMENTS

| | | | |
|---|---|---|---|
| 2016/0095102 A1* | 3/2016 | Yu | H04L 5/0057 |
| | | | 455/452.2 |
| 2017/0026938 A1 | 1/2017 | Onggosanusi et al. | |
| 2017/0207843 A1* | 7/2017 | Jung | H04B 7/0408 |
| 2017/0207845 A1* | 7/2017 | Moon | H04B 7/088 |
| 2017/0238216 A1 | 8/2017 | Damnjanovic et al. | |
| 2019/0013857 A1* | 1/2019 | Zhang | H04B 7/0695 |

\* cited by examiner

TECHNIQUES FOR RECEPTION BEAM REFINEMENT

CROSS REFERENCES

The present application for patent claims priority to U.S. Provisional Patent Application No. 62/471,188 by Levitsky, et al., entitled "Techniques For Reception Beam Refinement," filed Mar. 14, 2017, assigned to the assignee hereof.

BACKGROUND

The following relates generally to wireless communication, and more specifically to techniques for reception beam refinement.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, orthogonal frequency division multiple access (OFDMA) systems, (e.g., a Long Term Evolution (LTE) system, or a New Radio (NR) system), and space division multiple access (SDMA) systems. A wireless multiple-access communications system may include a number of base stations or access network nodes, each simultaneously supporting communication for multiple communication devices, which may be otherwise known as user equipment (UE).

In some examples, directional communication links are used to communicate information between different network entities, such as base stations and UEs. Beamforming signal processing techniques may be used by a transmitting entity, or a receiving entity, or both to establish the directional communication links. Because directional beams serve a limited geographic area, to maintain the quality of the directional communication link the beam configurations of the directional beams may need to be refined. Some refinement methods, however, may be ineffective or may fail to prevent problems associated with reception beam refinement.

SUMMARY

The described techniques relate to improved methods, systems, devices, or apparatuses that support synchronized reception beam refinement. A base station may indicate to a UE a time when a reception beam refinement event may occur. The UE may initiate a synchronized reception beam refinement procedure based on receiving the indication from the base station. The UE may identify a new reception beam configuration based on data stored locally by the UE and ongoing background calculations that the UE carries out based on periodic beam reference signals. At the time indicated, the UE may adjust the reception beam configuration of a reception beam. The base station may initiate one or more link maintenance procedures based on a reception beam refinement event occurring. Such techniques may reduce the loss of data due to link degradation after a reception beam refinement event.

A method of for wireless communication is described. The method may include communicating with a base station using at least a reception beam having a first reception beam configuration, receiving beam trigger information including a refinement schedule from the base station, the refinement schedule indicating a time for modifying reception beam configurations, identifying a second reception beam configuration based at least in part on the beam trigger information, and switching from the first reception beam configuration to the second reception beam configuration at the time based at least in part on the identifying.

An apparatus for wireless communication is described. The apparatus may include means for communicating with a base station using at least a reception beam having a first reception beam configuration, means for receiving beam trigger information including a refinement schedule from the base station, the refinement schedule indicating a time for modifying reception beam configurations, means for identifying a second reception beam configuration based at least in part on the beam trigger information, and means for switching from the first reception beam configuration to the second reception beam configuration at the time based at least in part on the identifying.

Another apparatus for wireless communication is described. The apparatus may include a processor, memory in electronic communication with the processor, and instructions stored in the memory. The instructions may be operable to cause the processor to communicate with a base station using at least a reception beam having a first reception beam configuration, receive beam trigger information including a refinement schedule from the base station, the refinement schedule indicating a time for modifying reception beam configurations, identify a second reception beam configuration based at least in part on the beam trigger information, and switch from the first reception beam configuration to the second reception beam configuration at the time based at least in part on the identifying.

A non-transitory computer readable medium for wireless communication is described. The non-transitory computer-readable medium may include instructions operable to cause a processor to communicate with a base station using at least a reception beam having a first reception beam configuration, receive beam trigger information including a refinement schedule from the base station, the refinement schedule indicating a time for modifying reception beam configurations, identify a second reception beam configuration based at least in part on the beam trigger information, and switch from the first reception beam configuration to the second reception beam configuration at the time based at least in part on the identifying.

In some examples of the method, apparatus, and non-transitory computer-readable medium described above, a transmission beam configuration of a transmission beam of the base station remains the same during the switching.

Some examples of the method, apparatus, and non-transitory computer-readable medium described above may further include processes, features, means, or instructions for identifying one or more beam reference signals received before the time, wherein identifying the second reception beam configuration may be based at least in part on the one or more beam reference signals.

Some examples of the method, apparatus, and non-transitory computer-readable medium described above may further include processes, features, means, or instructions for identifying a reception beam performance parameter based at least in part on a beam reference signal received from the base station before the time indicated by the refinement schedule, wherein identifying the second reception beam configuration may be based at least in part on the reception beam performance parameter.

In some examples of the method, apparatus, and non-transitory computer-readable medium described above, the refinement schedule indicates at least a portion of a slot for modifying reception beam configurations.

Some examples of the method, apparatus, and non-transitory computer-readable medium described above may further include processes, features, means, or instructions for receiving beam state information of a transmission beam based from the base station, wherein identifying the second reception beam configuration may be based at least in part on the beam state information.

Some examples of the method, apparatus, and non-transitory computer-readable medium described above may further include processes, features, means, or instructions for communicating with the base station using the second reception beam configuration.

In some examples of the method, apparatus, and non-transitory computer-readable medium described above, the second reception beam configuration may be switched by the UE based at least in part on data stored by the UE exclusive of data stored at the base station.

Some examples of the method, apparatus, and non-transitory computer-readable medium described above may further include processes, features, means, or instructions for transmitting a message to the base station indicating that the first reception beam configuration may have been switched to the second reception beam configuration.

In some examples of the method, apparatus, and non-transitory computer-readable medium described above, the message may be transmitted before the UE transmits a channel state feedback report associated with the second reception beam configuration.

Some examples of the method, apparatus, and non-transitory computer-readable medium described above may further include processes, features, means, or instructions for identifying a trigger event indicated by the beam trigger information, wherein identifying the second reception beam is based at least in part on identifying the trigger event. Some examples of the method, apparatus, and non-transitory computer-readable medium described above may further include processes, features, means, or instructions for identifying channel state feedback (CSF) of the first reception beam configuration and the second reception beam configuration based at least in part on a beam reference signal received from the base station, wherein identifying the second reception beam is based at least in part on identifying CSF of the first reception beam configuration and the second reception beam configuration.

A method of for wireless communication is described. The method may include communicating with a user equipment (UE) using a serving beam, the serving beam including a transmission beam having a transmission beam configuration and a reception beam having a reception beam configuration, transmitting beam trigger information including a refinement schedule to the UE, the refinement schedule indicating a time for modifying the reception beam configuration, and initiating a procedure, at the time, to prevent link degradation between a reception beam configuration switching event and receipt of a channel state feedback report generated.

An apparatus for wireless communication is described. The apparatus may include means for communicating with a user equipment (UE) using a serving beam, the serving beam including a transmission beam having a transmission beam configuration and a reception beam having a reception beam configuration, means for transmitting beam trigger information including a refinement schedule to the UE, the refinement schedule indicating a time for modifying the reception beam configuration, and means for initiating a procedure, at the time, to prevent link degradation between a reception beam configuration switching event and receipt of a channel state feedback report generated.

Another apparatus for wireless communication is described. The apparatus may include a processor, memory in electronic communication with the processor, and instructions stored in the memory. The instructions may be operable to cause the processor to communicate with a user equipment (UE) using a serving beam, the serving beam including a transmission beam having a transmission beam configuration and a reception beam having a reception beam configuration, transmit beam trigger information including a refinement schedule to the UE, the refinement schedule indicating a time for modifying the reception beam configuration, and initiate a procedure, at the time, to prevent link degradation between a reception beam configuration switching event and receipt of a channel state feedback report generated.

A non-transitory computer readable medium for wireless communication is described. The non-transitory computer-readable medium may include instructions operable to cause a processor to communicate with a user equipment (UE) using a serving beam, the serving beam including a transmission beam having a transmission beam configuration and a reception beam having a reception beam configuration, transmit beam trigger information including a refinement schedule to the UE, the refinement schedule indicating a time for modifying the reception beam configuration, and initiate a procedure, at the time, to prevent link degradation between a reception beam configuration switching event and receipt of a channel state feedback report generated.

In some examples of the method, apparatus, and non-transitory computer-readable medium described above, the transmission beam configuration of the transmission beam remains the same during the modification to reception beam configurations.

In some examples of the method, apparatus, and non-transitory computer-readable medium described above, initiating the procedure comprises: scheduling a channel state information reference signal based at least in part on the beam trigger information.

In some examples of the method, apparatus, and non-transitory computer-readable medium described above, initiating the procedure comprises: transmitting data to the UE using a robust transmission scheme before receiving the channel state feedback report from the UE based at least in part on the beam trigger information.

In some examples of the method, apparatus, and non-transitory computer-readable medium described above, initiating the procedure comprises: postponing a data transmission to the UE until after the channel state feedback report may be received from the UE based at least in part on the beam trigger information, the channel state feedback report being generated based at least in part on a new reception beam configuration different from an original reception beam configuration.

In some examples of the method, apparatus, and non-transitory computer-readable medium described above, the UE a new reception beam configuration at the time based at least in part on data stored by the UE exclusive of data stored at the base station. Some examples of the method, apparatus, and non-transitory computer-readable medium described above may further include processes, features, means, or instructions for identifying a trigger event indicated by the beam trigger information, wherein initiating the procedure is based at least in part on identifying the trigger event.

DETAILED DESCRIPTION

A wireless communications system may use serving beams including both a transmission beam and reception beam to establish directional communication links. As a UE moves through a coverage area of a base station, the UE may leave the specific coverage area served by the serving beam or other problems may occur. To maintain the directional communication link between the base station and the UE, the beam configuration (e.g., beam target, beam width, beam direction) of the serving beam may be refined. Beam refinement procedures may include modifying the transmission beam, the reception beam, or both to maintain the directional communication link. In some cases, beam refinement procedures may cause the quality of the directional communication link to degrade rather than improve. For example, if the UE engages in autonomous reception beam refinement procedures, the directional communication link may degrade without the base station knowing, and data may be lost.

Techniques for synchronized reception beam refinement are described herein. A base station may indicate to a UE a time when a reception beam refinement event may occur. The UE may initiate a synchronized unilateral reception beam refinement procedure based on receiving the indication from the base station. The UE may identify a new reception beam configuration based on data stored locally by the UE. At the time indicated, the UE may adjust the reception beam configuration of a reception beam. The base station may initiate one or more link maintenance procedures based on a likelihood that a reception beam refinement event has occurred. Such techniques may reduce the loss of data due to link degradation after a reception beam refinement event.

Aspects of the disclosure are initially described in the context of a wireless communications system. Aspects of the disclosure are illustrated by and described with reference to a communication scheme. Aspects of the disclosure are further illustrated by and described with reference to apparatus diagrams, system diagrams, and flowcharts that relate to techniques for reception beam refinement.

Figure 1:
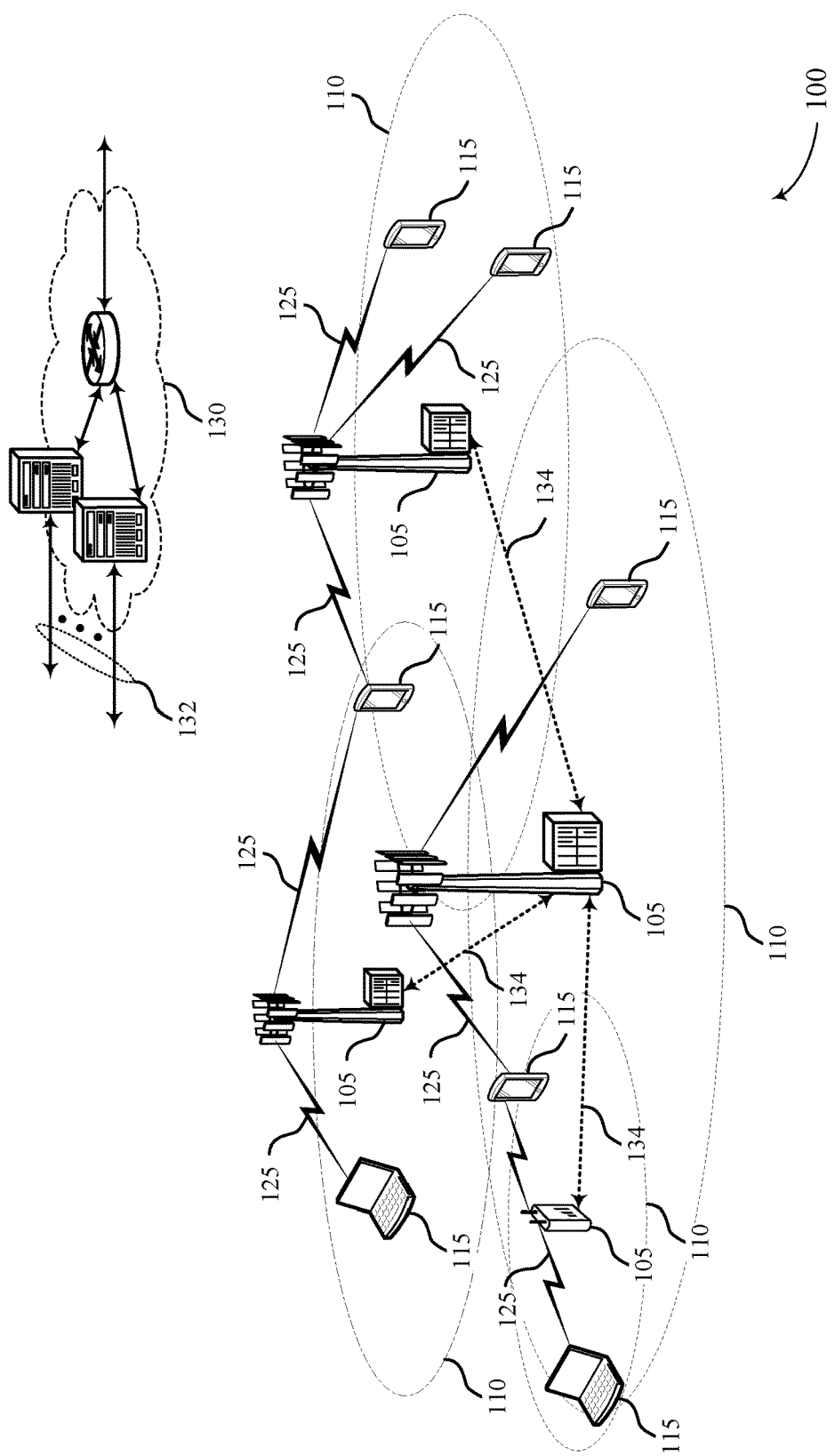
FIG. 1 illustrates an example of a system for wireless communication that supports techniques for reception beam refinement in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio network. In some cases, wireless communications system 100 may support enhanced broadband communications, ultra-reliable (i.e., mission critical) communications, low latency communications, and communications with low-cost and low-complexity devices.

In some examples, a UE 115 may implement a unilateral reception beam refinement procedure based on a synchronized timing received from the base station 105. Such a synchronized timing may mitigate adverse effects that may otherwise occur after a reception beam configuration has been modified and before additional feedback data may be analyzed by the base station 105.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105-*a* may include subcomponents such as an access network entity 105-*b*, which may be an example of an access node controller (ANC). Each access network entity 105-*b* may communicate with a number of UEs 115 through a number of other access network transmission entities 105-*c*, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each orthogonal frequency-division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD or a combination of both.

Figure 2:
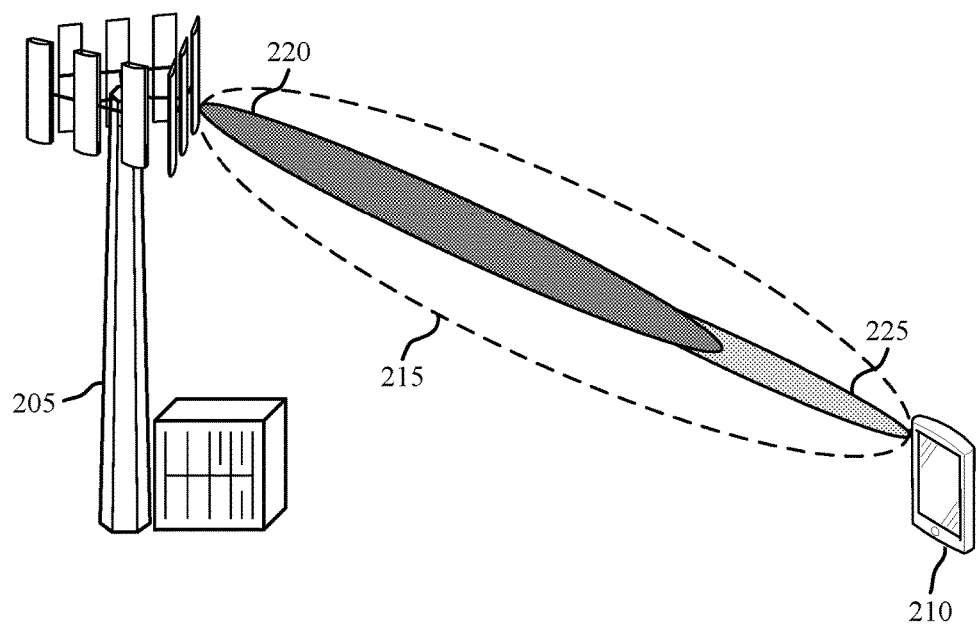
FIG. 2 illustrates an example of a wireless communications system that supports techniques for reception beam refinement in accordance with aspects of the present disclosure.

FIG. 2 illustrates an example of a wireless communications system 200 that supports techniques for reception beam refinement in accordance with various aspects of the present disclosure. The wireless communications system 200 may include a base station 205 and a UE 210 communicating using a serving beam 215. The serving beam 215 may be an example of a directional communication link. The serving beam 215 may include a transmission beam 220 and reception beam 225. The transmission beam 220 and the reception beam 225 may be examples of directional beams related to one or more respective devices. In the illustrated example, the transmission beam 220 originates from the base station 205 and the reception beam 225 originates from the UE 210 (e.g., a downlink situation). In other examples, the beams may originate from different entities (e.g., an uplink situation). The base station 205 may be an example of the base stations 105 described with reference to FIG. 1. The UE 210 may be an example of the UEs 115 described with reference to FIG. 1.

Directional communication links may provide a high-bandwidth link between a base station 205 and a UE 210. Signal processing techniques, such as beamforming, may be used to coherently combine energy to form the directional communication link. Wireless communication links achieved through beamforming may be associated with narrow beams (e.g., "pencil beams") that are highly directional, minimize inter-link interference, and provide high-bandwidth links between wireless nodes (e.g., base stations, access nodes, UEs). Such directional beams may serve a limited geographic area. In addition, directional beams be generated in an analog or digital manner.

Due to the limited geographic area served by directional communication links, as a UE 115 moves throughout the coverage of the wireless communications system 200, the directional communication links may be refined to maintain the quality of the communication link. Beam refinement procedures may be implemented by either the base station 205, the UE 210, or combinations thereof to refine the targeting of the directional beams.

In some directional communication links, both the transmission entity and the reception entity may implement beamforming processing techniques to establish, maintain or improve the quality of the directional communication link. For example, the base station 205 may implement beamforming techniques to establish or adjust a transmission beam configuration of the transmission beam 220. In another example, the UE 210 may implement beamforming techniques to establish or adjust a reception beam configuration of the reception beam 225. In some examples, the reception beam 225 may refer to directional listening as implemented by a receiving entity in the wireless communications system 200. Directional listening using beamforming techniques may not result in a physical beam being produced. However, directional listening using beamforming techniques exhibit many of the same characteristics as transmission beams (e.g., beam target, beam width, beam direction). As such, descriptions of directional listening may include references to a reception beam as a way to describe what is occurring.

The serving beam 215 may be used to communicate data between different network entities using directional beams. The serving beam 215 may refer to a combination of both the transmission beam 220 and the reception beam 225. In effect, the transmission beam 220 and the reception beam 225 cooperate to define the serving beam 215. In some examples, the serving beam 215 may include only a transmission beam 220 or a reception beam 225.

The wireless communications system 200 may support directional transmissions that use analog beamforming on both the transmission (Tx) and the reception (Rx) side. In some cases, the wireless communications system 200 may use millimeter wave (mmW) signals to communicate information (e.g., NR communications system sometimes referred to as 5G). Data transmission in a mmW communications system may use a combination of the transmission beam 220 and the reception beam 225 that establish throughput and reliability of the transmission link.

To facilitate both efficient and reliable in time communications, a combination of the transmission beam 220 and the reception beam 225 may be adaptively identified and tracked by the wireless communications system 200. A combination of the transmission beam 220 and the reception beam may be considered a composite serving beam 215 used for data transmission, for example, in a physical downlink shared channel (PDSCH). To facilitate tracking of the serving beam 215, the transmission beam 220 and the reception beam 225 may be repeatedly reselected and refined by the wireless communications system 200 using different mechanisms and logical channels, as may be designed for this particular purpose. In each instance that the communications system estimates a new beam configuration (i.e., either an independent Tx or Rx beam, or a coupled combination of both a Tx and Rx beam) to be a potential improvement over the previously used beam configuration, a beam switching event may occur.

The types of beam switching events or beam refinement events that the wireless communications system 200 may execute include at least three categories. In a first category, the serving beam 215 may switch to a new alternative beam. In some examples of the first category, both the transmission beam 220 and the reception beam 225 may be changed, or in some cases refined. In a second category, the transmission beam 220 may be refined for the serving beam 215. In a third category, the reception beam 225 may be refined for the serving beam 215.

A channel (e.g., a PDSCH) and a capacity associated with the channel may change each time a beam switching event or a beam refinement event occurs for the transmission beam 220, the reception beam 225, or both. Channel state information (CSI) may be used to qualify channel conditions associated with the channel, and to assist in link adaptation procedures that may be used in the communications system to provide for robust and reliable communications. In some cases, CSI may be measured on the Rx side (e.g., UE 210) and subsequently transmitted back to the Tx side (e.g., base station 205) to be used to adaptively optimize a transmission configuration to current channel conditions. CSI messages may be used to transmit parameters including, for example, a digital precoding matrix indicator (PMI), a rank indicator (RI) and a channel quality indicator (CQI) which may be linked to an associated modulating and coding scheme (MCS) index that may describe a corresponding optimal digital precoding scheme, a number of spatial layers, and a modulation and code rate suggested for the transmission on the Tx side (e.g., base station 205).

The parameters, as transmitted in CSI messages, may be included in a channel state feedback (CSF) report that may be measured on the Rx side (e.g., the UE 210) using, for example, a channel state information reference signal (CSI-RS) logical channel, and may then be subsequently transmitted back to the Tx side (e.g., the base station 205). Each time that a beam switching event occurs, the previous CSF may be invalidated due to changed channel conditions. However, as a result, for the time period between the beam switching event and obtaining a first updated CSF report, link performance may degrade due to a mismatch between the known CSF values and the changed CSI. A resulting negative impact on data transmission as a result of this beam switching event may be referred to as a transient period in link performance.

As discussed previously, the wireless communications system 200 may include at least three categories of beam switching events or beam refinement events. How each of these three categories may be implemented is described herein.

The first category of beam switching event may include a synchronized switching of the serving beam 215. In such events, both the transmission beam 220 and the reception beam 225 may be switched. In some cases, the base station 205 may trigger a synchronized beam switching event of the serving beam 215. The base station 205 may report a new beam configuration reported in beam state information (BSI) using a corresponding BSI beam index. This beam switching mechanism may, in some cases, be referred to as BSI/BRS based beam switching. The base station 205 may send a beam switching trigger to a receiving entity of the wireless communications system 200. The beam switching event may accordingly take place at a predefined time as defined for the Tx side (e.g., base station 205) and the Rx side (e.g., UE 210).

At the predefined time, the base station 205 may switch the configuration of the transmission beam 220 to a particular BRS (beam reference signal) beam configuration associated with a relevant BSI index as defined in beam switching control information in the beam switching trigger. The UE 210 may correspondingly switch the reception beam 225 to an Rx beam configuration corresponding to an Rx beam index associated with the relevant BSI index. The Rx beam index used for evaluation of a BSI report member may be stored in internal records the UE 210. BRS/BSI-based beam switching may allow a UE 210 to determine which BRS beam index may be used for composition of the current serving beam. Thus, the UE 210 may know which BRS beam index to use to associate measurements based on mandatory and period BRS signals to the current serving beam.

The second category of beam switching event may include a switching or refinement of the transmission beam 220. A beam switching event at the Tx side (e.g., base station 205), may include coarse Tx beam selection and coarse Tx beam refinement. Such procedures may be based on a BRS, as may be used to select a corresponding BRS beam. A selected BRS beam may be reported by the Rx side (e.g., UE 210) to the Tx side (e.g., base station 205) using beam state information report, as measured by an associated BRS-RP. Selecting a coarse serving beam and alternative beam tracking and switching may be based on the BSI report. However, selecting a beam based on the CRS-RP metric may not have an optimal channel efficiency.

In some examples, refinement procedures or beam switching procedures for the transmission beam 220 may be performed in the system using a channel state information reference signal (CSI-RS). A CSI-RS may be allocated aperiodically for CSF evaluation and for tracking of channel conditions for efficient link adaption. A CSI-RS allocation (i.e., a CSI-RS session) may be associated with a particular transmission beam in which the base station 205 may be interested in measuring CSF. In this case, the transmission beams may be allocated over multiple ports separated in the frequency domain. CSF may be measured on the Rx side, which may provide a rank indicator, pre-matrix indicators, and channel quality information qualifiers for a physical channel associated with the measured beam.

Thus, different potential transmission beams may be evaluated by the base station 205 by allocating them for different CSI-RS sessions. The relevant CSF corresponding to a particular beam may then be transmitted back to the base station 205 for each CSI-RS session. The base station 205 may then analyze different CSF reports to select a particular beam that may be optimized for a relatively higher channel efficiency. Transmission beam refinement, tracking, and switching may thus be done according to a selected based on CSF. Additionally or alternatively, CSI-RS may further be used to assist beam tracking and switching. Thus, switching a serving beam based on CSF comparison according to this described technique may provide for switching to a beam having a relatively higher channel efficiency.

The third category of beam switching event may include a switching or refinement of the reception beam 225. A beam switching event at the Rx side (e.g., UE 210), for example, reception beam selection and reception beam refinement, may be based on a beam reference signal (BRS). In some cases, CSF measurements may be taken based on the BRS. In some cases, the BRS may be referred to as a beam management reference signal. A BRS may be included in the system to periodically sweep each of the transmission beams 220 as may be predefined in the wireless communications system 200. Each potential transmission beam may be transmitted using a single antenna port, where each transmission beam may then be separated on the time domain and the frequency domain. This may provide for measurements on the Rx side (e.g., UE 210) to facilitate selecting a particular reception beam 225 for a BRS on each transmission beam 220.

In some cases where a single antenna port is used to transmit each potential transmission beam 220, selecting a reception beam 225 may be based on relative power measurements between the beams, for example, based on a BRS received power (BRS-RP) metric. In some cases, BRS-RP may be referred to as channel state information received signal received power (CSI-RSRP), channel state information received signal received quality (CSI-RSRQ), or a combination thereof. The BRS-RP metric may, however, not provide information relating to associated RI, PMI, and CQI qualifiers associated with the channel. Thus, the reception beam selection in this manner may not select a beam with optimal channel conditions.

In some examples, a beam switching event at the Rx side (e.g., UE 210), for example, reception beam selection and reception beam refinement, may be based on a beam refinement reference signal (BRRS). In some cases, a BRRS may be referred to as a CSI-RS. In some examples, the CSI-RS may perform the functions of both the BRS and the BRRS. A base station 205 may allocate BRRSs in the system. A resource identifier for a resource allocation may be used for refinement of the transmission beam 220 using one or more associated PMI parameters for digital precoding. The resource identifier may further be used for refinement of the reception beam 225. Each resource ID for the reception beam 225 may be allocated using more than one antenna port, where each antenna port may be separated in the frequency domain. Reception beam selection may accordingly be based on a spectral efficiency metric, where the spectral efficiency metric may provide for an optimal reception beam to be selected, which may improve channel conditions as compared to potential alternative reception beams.

In the wireless communications system 200, a base station 205 may centrally coordinate the communications of the entities of the wireless communications system 200. In such examples, the wireless communications system 200 may use a contention-free radio access technology to communicate (e.g., 3G, LTE, 5G), as opposed to a contention-based radio access technology (e.g., Wi-Fi). In some examples, however, the Rx side (e.g., UE 210) may be capable of performing reception beam refinement procedures or reception beam switching procedures without coordinating with the base station 205. As stated previously, beam switching events or beam refinement events may degrade the quality of a communication link rather than improve the quality for a variety of reasons. If the UE 210 executes an autonomous beam refinement procedure, the base station 205 may be unaware of potential interruptions to the communication link and data may be lost in transit.

When the UE 210 executes an autonomous beam refinement procedure, a transient period may occur where the quality of the link is degraded. The transient period may be defined between when the UE 210 modifies the beam characteristics and when the base station 205 receives the next CSF report detailing link quality parameters. In some cases, it may be desirable to avoid the transient period following a beam switching event. In some cases, if a transient period cannot be avoided, a device at the Tx side (e.g., the base station 205) may perform operations to avoid link degradation. To do so, the base station 205 may, for example, schedule a CSI-RS as quickly as possible after a beam switching event to obtain updated CSF values. Additionally or alternatively, the base station 205 may utilize a more robust transmission scheme for data transmissions during the transient period. Additionally or alternatively, the base station 205 may postpone data transmission until updated CSF values may be obtained.

In some instances, to perform operations to avoid link degradation, the base station 205 may be aware of the transient interval. For example, for a serving beam switching event (the first category) or a transmission beam switching event (the second category), the base station 205 may be in control about when such events occur. In the case that a beam switching event of the transmission beam 220 or the serving beam 215, the beam switching event may be triggered and controlled on the Tx side (e.g., base station 205). In such a manner, the base station 205 may provide for full synchronization of the timing of the operations of the base station 205 relative to the transient interval. However, in the case of beam refinement at the Rx side (e.g., UE 210), a decision to switch and accompanying beam switching timing may be controlled at the Rx side (e.g., the UE side). In such a case, the reception beam switching event may not synchronized with the base station 205.

To resolve the potential lack of synchronization in the case of a beam refinement or beam switching event at the Rx side (e.g., UE 210), the UE 210 may execute reception beam refinement procedures in a synchronized manner with the base station 205. With this technique, a base station 205 may accordingly be aware of a potential transient period associated with the expected or synchronized beam switching event. Additionally or alternatively, a different system configuration may be used in which a beam witching event may occur without an accompanying transient period.

Synchronizing the beam refinement or beam switching event at the Rx side, may mitigate or avoid the possibility for link degradation after the reception beam switching event. For example, in some cases, the UE 210 may execute a synchronized beam switching event when the CSF is not known. In some cases, the UE 210 may execute a synchronized beam switching event when a precise timing of a new reception beam application is unknown, when a precise association of the CSF with the specific reception beam is not permitted, or a combination thereof. In some cases, the UE 210 may execute a synchronized beam switching event when BRRS signal is not available to be used by the UE 210. In some cases, the UE 210 may execute a synchronized beam switching event when there is no detailed CSI reporting (e.g., RI, PMI, CQI) for beam management. In some cases, the UE 210 may execute a synchronized beam switching event when CSI-RS allocations for beam management in the wireless communication system 200 are allocated to use a maximum of two ports and cannot provide a basis for a full CSF evaluation of PDSCH transmissions with a higher number of ports than the maximum number of ports allocated per beam in the beam management resource. In some cases, the UE 210 may execute a synchronized beam switching event when an automatic gain control cannot be adjusted before the UE switches to the new reception beam.

Figure 3:
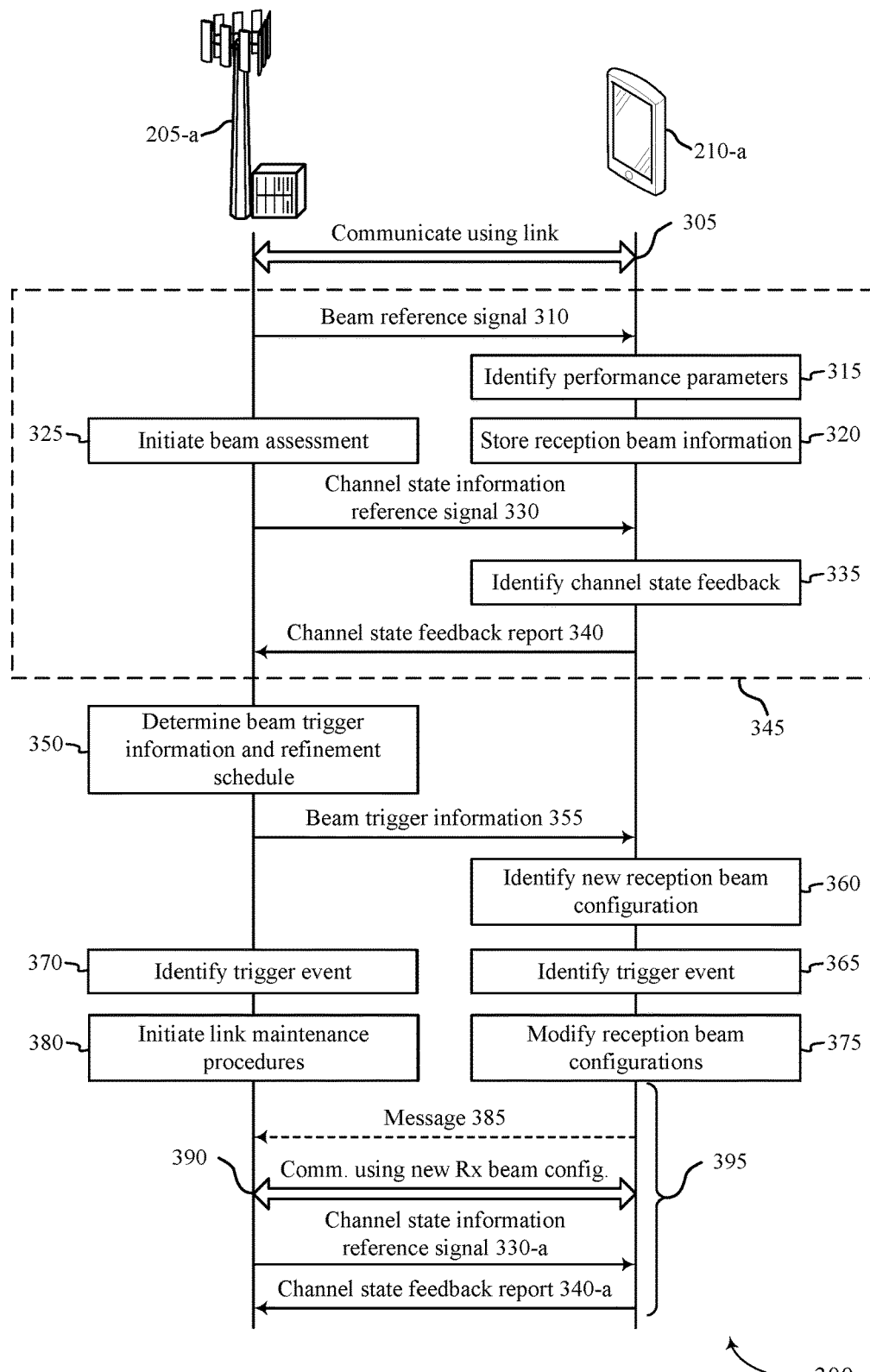
FIG. 3 illustrates an example of a communication scheme that supports techniques for reception beam refinement in accordance with aspects of the present disclosure.

FIG. 3 illustrates an example of a communication scheme 300 that supports techniques for reception beam refinement in accordance with various aspects of the present disclosure. The communication scheme 300 illustrates a synchronized unilateral reception beam refinement for the reception beam 225. The communication scheme 300 shows communications and procedures executed by a base station 205-$a$ and a UE 210-$a$ (e.g., a downlink scenario). In some examples, the functions of the base station 205-$a$ and the UE 210-$a$ may be reversed (e.g., an uplink scenario).

At block 305, the base station 205-$a$ and the UE 210-$a$ may communicate using a directional wireless link (e.g., serving beam 215). Communicating using the directional link may include the procedures of establishing the directional link and exchanging data using the directional link. At some point before, during, or after establishing the directional link, the base station 205-$a$ and the UE 210-$a$ may determine the capabilities of the other network entity. For example, one entity (either the base station 205-$a$ or the UE 210-$a$) may learn through messaging whether the other entity (base station 205-$a$ or UE 210-$a$) is capable of transmitting or receiving beam refinement reference signals. In some examples, the execution of the synchronized unilateral reception beam refinement is based at least in part on one or both of the entities being incapable of communicating BRRSs or may, alternatively, be based on other conditions, including those related to one or more directional links.

When communicating using the directional link, the base station 205-$a$ and the UE 210-$a$ may exchange various messages or signals to maintain a link quality of the serving beam 215. For example, the base station 205-$a$ (e.g., the transmitting entity) may transmit a beam reference signal 310 to the UE 210-$a$ (e.g., the receiving entity). The beam reference signal session (BRS session) may be configured to inform the UE 210-$a$ about one or more (or each) transmission beams the base station 205-$a$ is capable of transmitting. A BRS session may be included in the system to periodically sweep each of the transmission beams 220 as may be predefined in the wireless communications system 200. In some examples the beam reference signal 310 may include beam state information indicating a change of the transmission beam configuration. In some examples, the beam reference signal may coordinate a serving beam switching event where both the transmission beam 220 and the reception beam 225 are modified.

At block 315, the UE 210-$a$ identify performance parameters based on the beam reference signal 310. For example, the UE 210-$a$ may identify power measurements for each of the beam reference signals received as part of a BRS session. The UE 210-$a$ may compare the relative power measurements of each of the received beam reference signals 310. In some examples, the UE 210-*a* may determine a relative power parameter based on the power measurements of the different beam reference signals 310 (e.g., a BRS-RP metric). The power parameters such as BRS-RP metric may not provide information about RI, PMI, or CQI qualifiers of the channel.

At block 320, the UE 210-*a* stores the information associated with the beam reference signal 310 in a local memory. The information associated with the beam reference signal 310 may include signal identifiers, performance parameters associated with the different signals (e.g., power parameters such as the BRS-RP metric), other parameters, or combinations thereof. The information stored by the UE 210-*a* may be used in later beam refinement procedures.

At block 325, the base station 205-*a* initiate a beam assessment procedure. The base station 205-*a* may initiate the beam assessment to determine whether beam refinement procedures are needed to improve the quality of the directional communication link. In some examples, the beam assessment procedure may include indicated a transmission beam refinement using one or more CSI-RS sessions.

The base station 205-*a* may transmit a channel state information reference signal 330 (CSI-RS 330) as part of a beam assessment. The CSI-RS 330 may be associated with the current beam reference signal 310 beams. The CSI-RS 330 may be configured to determine performance parameters of the serving beam 215. The CSI-RS 330 may be based on the beam reference signal 310. The CSI-RS 330 may be used as part of a beam refinement procedure, in some situations. In some examples, the CSI-RS 330 may be used to determine channel conditions of the serving beam 215.

At block 335, the UE 210-*a* may identify channel state feedback based on receiving the CSI-RS 330. The UE 210-*a* may evaluate the state of the channel based at least in part on information included in the CSI-RS 330, characteristics of the CSI-RS 330 or combinations of thereof.

The UE 210-*a* may generate and transmit a channel state feedback report 340 based on the channel state feedback identified at block 335. The channel state feedback report 340 may be configured to inform the base station about the quality of the communication link (e.g., the quality of the serving beam 215).

Block 345 represents functions that may be performed repeatedly while a directional serving beam 215 is active between the base station 205-*a* and the UE 210-*a*. The functions related to BRS sessions or the beam assessment procedures may be executed in any order or any number of times. The functions represented at block 350 and beyond describe a process for synchronized unilateral reception beam switching. The unilateral reception beam switching may be performed in conjunction with the process already described. In some examples, the synchronized unilateral reception beam switching may refer to procedures that include portions that are executed without coordinating with another network entity. In a synchronized unilateral beam refinement procedure, the UE 210-*a* may analyze data, select a new beam configuration, modify the beam, or combinations thereof without input from the base station 205-*a*. In some examples, however, the base station 205-*a* may coordinate some aspects of an autonomous beam refinement procedure, such as the timing that the synchronized unilateral reception beam refinement procedure is executed. Once the base station 205-*a* specifies the timing, the rest of the procedure may be executed by the UE 210-*a*.

At block 350, the base station 205-*a* may determine beam trigger information and a refinement schedule as part of a synchronized unilateral reception beam refinement procedure. Determining the beam trigger information may be based on metrics used to determine whether reception beam refinement may be needed. In some instances, the base station 205-*a* may determine beam trigger information and the refinement schedule based on not executing a reception beam refinement for specific duration of time. For example, the base station 205-*a* may determine whether a coordinated serving beam refinement event or a reception beam refinement event has occurred in a specific duration of time. The base station 205-*a* may determine that a synchronized unilateral reception beam refinement procedure is needed based on such information. In some examples, a synchronized unilateral reception beam refinement procedure is initiated based at least in part on a transmission beam configuration remaining the same. In some examples, the base station 205-*a* may determine beam trigger information and a refinement schedule based on a periodic schedule, regardless of transmission beam refinement procedures that have been performed.

The base station 205-*a* may transmit the beam trigger information 355 and the refinement schedule to the UE 210. The beam trigger information 355 may indicate a trigger event for performing a synchronized unilateral reception beam refinement procedure. The beam trigger information 355 or the refinement schedule may indicate a time at which the UE 210-*a* is permitted to modify its reception beam configuration. In some examples, the beam trigger information 355 or the refinement schedule may indicate a time interval during which the UE 210-*a* is permitted to modify its reception beam configuration.

In some examples, the beam trigger information 355 or the refinement schedule may indicate a communication resource (e.g., a slot, sub-frame, resource block), or a portion of a communication resource, during which the UE 210-*a* is permitted to modify its reception beam configuration. In some examples, the beam trigger information 355 includes the refinement schedule and the information included in the refinement schedule. In some examples, the beam trigger information 355 may include information to cause the UE 210-*a* to start a predetermined timer, where the UE 210-*a* may modify reception beam configurations following the expiration of the timer.

The beam trigger information 355 may include information regarding new transmission beam configuration. In some examples, the beam trigger information may indicate the new transmission beam configuration based on a beam index from a BSI report obtained from the UE 210-*a*. By having the transmission beam indexes from the BSI report, the UE 210-*a* may know identify a reception beam configuration that matches the new transmission beam configuration. The UE 210-*a* may use the transmission beam configuration information in the beam trigger information to identify which reception beam configuration to implement.

In some instances, the refinement schedule may indicate a periodic schedule for implementing synchronized unilateral reception beam refinement procedures. The periodic schedule may be stored locally at the UE 210-*a* and the base station 205-*a*. As such, the base station 205-*a* and the UE 210-*a* may execute synchronized unilateral reception beam refinement procedures at the same time without exchanging communications to execute this specific instance of the procedure. As such, synchronized unilateral reception beam refinement procedures may be implemented based on the refinement schedule or the periodic schedule indicated by the refinement schedule.

At block 360, the UE 210-*a* may identify a new reception beam configuration for the reception beam 225. In some examples, the new reception beam configuration may be determined based on information obtained during one or more BRS sessions. The UE 210-*a* may store locally information learned from BRS sessions (e.g., performance parameters, power parameters). Based on the information locally stored by the UE 210-*a* related to BRS sessions, the UE 210-*a* may select a new reception beam configuration to replace an existing reception beam configuration. The UE 210-*a* may select the new reception beam configuration without receiving input from the base station 205-*a*. For example, while the base station 205-*a* may coordinate timing, the base station may not coordinate or consult with the UE 210-*a* about which new reception beam configuration is selected. Accordingly, the UE 210-*a* may selected the new reception beam configuration exclusive of information stored at the base station 205-*a*. A beam configuration may indicate a variety of characteristics of a directional beam such as a beam target, a beam width, etc.

In some examples, the new reception beam configuration is selected based on power parameters associated with the beam reference signals 310. In some examples, the UE 210-*a* may identify the new reception beam configuration based on receiving the beam trigger information 355. In some examples, the UE 210-*a* may identify the new reception beam configuration based on the latest BRS session. In such examples, the UE 210-*a* may maintain a rolling preferred new reception beam configuration and the UE 210-*a* is merely waiting for permission to implement the preferred new reception beam configuration. The UE 210-*a* may unilaterally identify the new reception beam configuration using data stored locally at the UE 210-*a* exclusive of data stored by the base station 205-*a*. Meaning, the base station 205-*a* does not coordinate the selection of the new reception beam configuration. The base station 205-*a*, however, may coordinate the timing the new reception beam configuration is implemented by the UE 210-*a*.

At block 365 and block 370, the UE 210-*a* and/or the base station 205-*a* may identify the trigger event indicated by the beam trigger information 355. In some examples, the trigger event may be identified as a time, a time interval, or a moment. In other examples, the trigger event may be a communication resource.

At block 375, the UE 210-*a* may modify the reception beam configuration based on the trigger event occurring. In some examples, the UE 210-*a* may switch from an existing reception beam configuration to a new reception beam configuration based on the trigger event occurring. Modifying the reception beam configuration introduces the possibility that a transient period 395 occurs.

The goal of refining the reception beam 225 is to improve the quality of the communication link. In some examples, however, refining the reception beam 225 with a new reception beam configuration may cause the quality of the communication link to degrade rather than improve. The transient period 395 may refer to the time period between modifying the reception beam configuration and receiving feedback information indicating the quality of the link using the new reception beam configuration. In some examples, the transient period may refer to the time period between modifying the reception beam switching event and receipt of a channel state feedback report.

At block 380, the base station 205-*a* may initiate one or more link maintenance procedures to prevent link degradation during the transient period 395. In some examples, the base station 205-*a* may transmit a CSI-RS 330 as soon as possible after the reception beam switching event. The base station 205-*a* may schedule the CSI-RS 330 as part of determining the beam trigger information 355. In some instances, the beam trigger information 355 may include an indication of a scheduled CSI-RS 330.

In some examples, the base station 205-*a* may use a more robust transmission scheme for data transmission during the transient period 395. Ensuring that data transmissions are transmitted in a more robust manner may reduce the likelihood that data is lost during the transient period 395. The base station 205-*a* may alter the transmission scheme based on transmitting the beam trigger information 355 or identifying that the trigger event has occurred.

In some examples, the base station 205-*a* may postpone data transmissions till after an updated channel state feedback report 340 has been obtained from the UE 210-*a*. The base station 205-*a* may refrain from transmitting data based on identifying that the trigger event has occurred. In some examples, the base station 205-*a* may implement any combination of these different link maintenance procedures.

In some examples, the UE 210-*a* may optionally transmit a message 385 to the base station 205-*a* indicating that a reception beam configuration is being changed or has been changed. The message 385 may be transmitted before or after the reception beam switching event occurs. In some examples, the UE 210-*a* may generate and transmit the message 385 based on identifying the new reception beam configuration. In some examples, the UE 210-*a* may generate and transmit the message 385 based on receiving the beam trigger information 355. In some examples, the UE 210-*a* may generate and transmit the message 385 based on identifying that the trigger event has occurred. In some examples, the UE 210-*a* may generate and transmit the message 385 based on modifying the reception beam configuration. In some examples, the message 385 may be transmitted after the reception beam switching event. In some examples, the message 385 may be transmitted before the reception beam switching event. In some examples, the message 385 may be a field in an existing message or report.

At block 390, the base station 205-*a* and the UE 210-*a* may communicate using the reception beam 225 having the new reception beam configuration. At some point in time, as part of that communication, a CSI-RS 330-*a* and a channel state feedback report 340-*a* may be communicated between the base station 205-*a* and the UE 210-*a*. The base station 205-*a* may use the channel state feedback report 340-*a* to determine whether the new reception beam configuration has improved or degraded the quality of the communication link or serving beam 215.

Executing a synchronized unilateral reception beam refinement procedure may be based on a number of conditions. For example, one condition may be that the BRRS signal may not be used or is used very rarely to refine the beams of the serving beam 215. For example, one of the communicating entities may be incapable of sending or receiving BRRSs. In another example, a condition may be that reception beam refinements may be done for efficient serving beam tracking 215. In another example, a condition may be that autonomous reception beam switching is not used on the Rx side. Avoiding completely autonomous reception beam switching events may avoid non-synchronized or unpredictable transient in link conditions that can follow an autonomous reception beam switching event. In some cases, the term autonomous may refer to actions performed by a UE 210-*a* that are not coordinated with the base station 205-*a*.

A synchronized unilateral reception beam refinement procedure may be based on serving beam switching mechanism described herein. In some cases, transmission beam switching may be done to the transmission beam before the beam switching trigger. From time to time, the base station 205-a may initiate beam switching trigger command with a BSI index that matches the current serving BRS beam. At a predefined time, the reception beam switching event may occur. The predefined time may be known to both the base station 205-a and the UE 210-a based on the beam trigger information 355. In some examples, the Tx side (e.g., base station 205-a) may not carry out any transmission beam changes during the synchronized unilateral reception beam refinement procedure. On the Rx side (e.g., UE 210-a), the UE 210-a may switch its current reception beam index (e.g., configuration) to an updated reception beam index associated with the requested BSI index from the control (e.g., beam trigger information 355) that triggers beam switching. The new reception beam index may be known to the UE 210-a from the internal records of the UE 210-a. The internal records of the UE 210-a may be updated at various times based on BRS measurements. Updating the reception beam index may be done based on the previous BRS signal sessions that included the relevant BRS beam index.

In some examples, the UE 210-a may select the reception beam index based on a BRS-RP metric. Some transient in channel conditions may be expected based on changing the reception beam index. Using a synchronized unilateral reception beam refinement procedure for switching the reception beam 225 may allow a synchronized slot in time where the transient period may take place. Because the base station 205-a knows that the transient period 395 may occur, the base station 205-a may take special measures to minimize the time duration and the negative impact of this transient period 395. Additional advantages of the synchronized unilateral reception beam refinement procedure may be related to a transmission beam refinement sequence assisted by CSI-RS that may not be interrupted by unexpected reception beam changes.

In some examples, a reception beam adjustment may be done in an autonomous way. In some cases, the base station 205-a may not be aware about any changes in the reception beam and possible transient effects may occur. For example, possible degradation in link conditions may be detected by the base station 205-a. The degradation may be delayed in being detected based on increased retransmissions rate. In some examples, the base station 205-a may implement some link adaptation measures to recover the communication link. Usage of frequent reception beam switches in order to refine and track reception beam can degrade link performance instead of improving it. Additional negative impacts may be related to unexpected reception beam change in perspective of transmission beam refinement based on CSI-RS sessions. It may cause ineffective serving beam refinement sequence because unsynchronized reception beam refinements may cause the comparison of different refined transmission beams to be done with non-constant reception beam. Some possible gain related to reception beam change may be associated to some tested refined transmission beams and as a result a better refined transmission beam estimations may be "smoothed". In some examples, reception beam adjustments may not be done at all or may be done very rarely in order to avoid the undesirable transient period. In some cases, it may be difficult to allow efficient serving beam tracking.

In some examples, a reception beam refinement procedure may include the processes that follow. A first time coarse serving beam may be established based on BRS measurements and BSI reports. A transmission beam refinement may be carried out based on multiple sessions of CSI-RS and corresponding CSF reports. A coarse serving transmission beam may be switched to a better refined transmission beam (associated to one of the CSF reports). A refined reception beam estimation may be based on multiple BRS sessions. A better reception beam index (e.g., configuration) may be updated in internal UE 210-a records. A reception beam switching event may occur to a improve a reception beam using a self-beam switching approach (e.g., a synchronized unilateral reception beam refinement procedure). An updated CSF evaluation for the refined serving beam may be received, which, in effect, may end a transient period 395 that starts after reception beam switching event.

The description recited herein is generally described in a downlink context where the base station 205 is the transmitter and the UE 210 is the receiver. It should be appreciated that the functions, operations, and procedures described herein may be applied in an uplink context where the base station is the receiver and the UE 210 is the transmitter.

Figure 4:
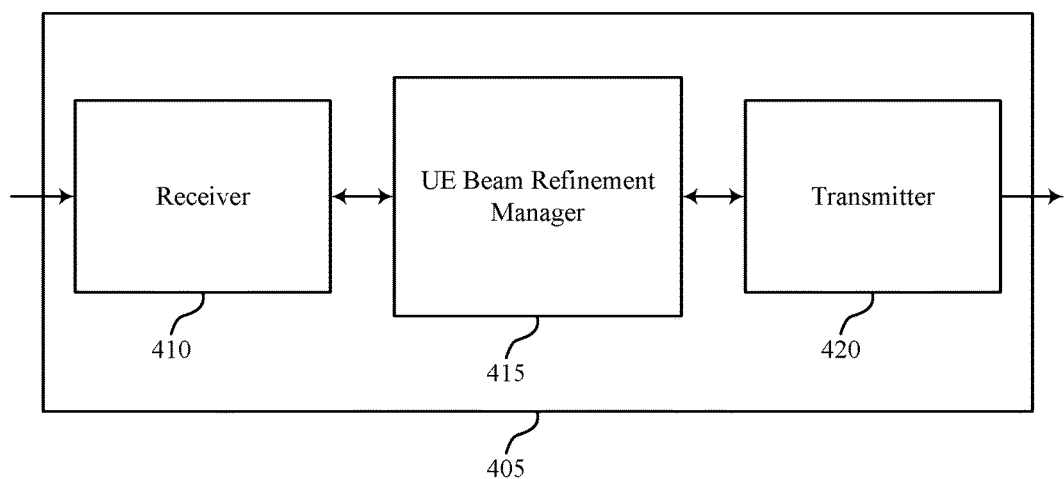
FIGS. 4 through 6 show block diagrams of a device that supports techniques for reception beam refinement in accordance with aspects of the present disclosure.

FIG. 4 shows a block diagram 400 of a wireless device 405 that supports techniques for reception beam refinement in accordance with aspects of the present disclosure. Wireless device 405 may be an example of aspects of a UE 115 as described with reference to FIG. 1. Wireless device 405 may include receiver 410, UE beam refinement manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to techniques for reception beam refinement, etc.). Information may be passed on to other components of the device. The receiver 410 may be an example of aspects of the transceiver 735 described with reference to FIG. 7. The receiver 410 may utilize a single antenna or a set of antennas.

UE beam refinement manager 415 may be an example of aspects of the UE beam refinement manager 715 described with reference to FIG. 7. UE beam refinement manager 415 and/or at least some of its various sub-components may be implemented in hardware, software executed by a processor, firmware, or any combination thereof. If implemented in software executed by a processor, the functions of the UE beam refinement manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE beam refinement manager 415 and/or at least some of its various sub-components may be physically located at various positions, including being distributed such that portions of functions are implemented at different physical locations by one or more physical devices. In some examples, UE beam refinement manager 415 and/or at least some of its various sub-components may be a separate and distinct component in accordance with various aspects of the present disclosure. In other examples, UE beam refinement manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE beam refinement manager 415 may communicate with a base station using at least a reception beam having a first reception beam configuration, receive beam trigger information including a refinement schedule from the base station, the refinement schedule indicating a time for modifying reception beam configurations, identify a second reception beam configuration based on the beam trigger information, and switch from the first reception beam configuration to the second reception beam configuration at the time based on the identifying.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas.

Figure 5:
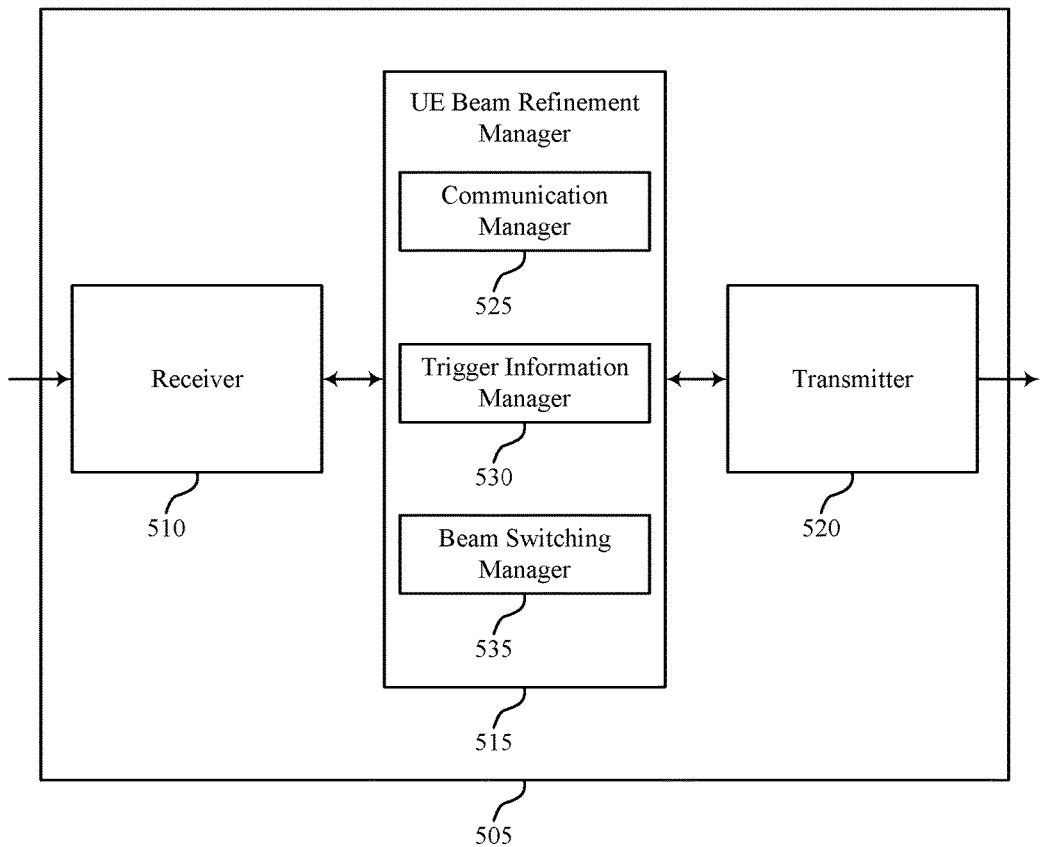

FIG. 5 shows a block diagram 500 of a wireless device 505 that supports techniques for reception beam refinement in accordance with aspects of the present disclosure. Wireless device 505 may be an example of aspects of a wireless device 405 or a UE 115 as described with reference to FIGS. 1 and 4. Wireless device 505 may include receiver 510, UE beam refinement manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to techniques for reception beam refinement, etc.). Information may be passed on to other components of the device. The receiver 510 may be an example of aspects of the transceiver 735 described with reference to FIG. 7. The receiver 510 may utilize a single antenna or a set of antennas.

UE beam refinement manager 515 may be an example of aspects of the UE beam refinement manager 715 described with reference to FIG. 7. UE beam refinement manager 515 may also include communication manager 525, trigger information manager 530, and beam switching manager 535.

Communication manager 525 may communicate with a base station using at least a reception beam having a first reception beam configuration and communicate with the base station using the second reception beam configuration.

Trigger information manager 530 may receive beam trigger information including a refinement schedule from the base station, the refinement schedule indicating a time for modifying reception beam configurations. In some cases, the refinement schedule indicates at least a portion of a slot for modifying reception beam configurations.

Beam switching manager 535 may identify a second reception beam configuration based on the beam trigger information, switch from the first reception beam configuration to the second reception beam configuration at the time based on the identifying, and transmit a message to the base station indicating that the first reception beam configuration has been switched to the second reception beam configuration. In some cases, a transmission beam configuration of a transmission beam of the base station remains the same during the switching. In some cases, the second reception beam configuration is switched by the UE based on data stored by the UE exclusive of data stored at the base station. In some cases, the message is transmitted before the UE transmits a channel state feedback report associated with the second reception beam configuration.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
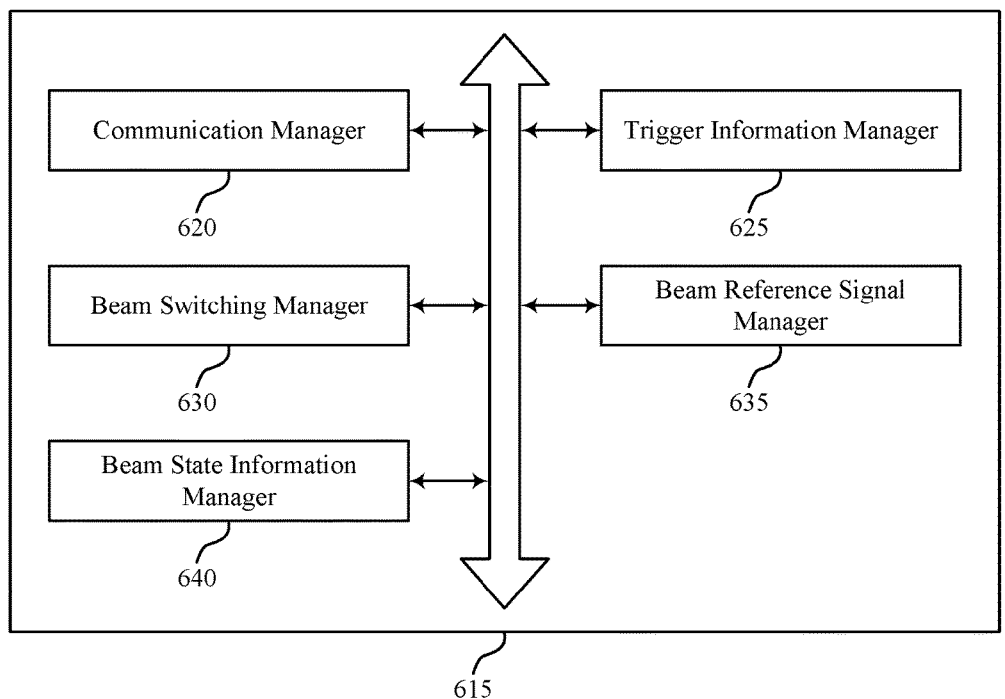

FIG. 6 shows a block diagram 600 of a UE beam refinement manager 615 that supports techniques for reception beam refinement in accordance with aspects of the present disclosure. The UE beam refinement manager 615 may be an example of aspects of a UE beam refinement manager 415, a UE beam refinement manager 515, or a UE beam refinement manager 715 described with reference to FIGS. 4, 5, and 7. The UE beam refinement manager 615 may include communication manager 620, trigger information manager 625, beam switching manager 630, beam reference signal manager 635, and beam state information manager 640. Each of these modules may communicate, directly or indirectly, with one another (e.g., via one or more buses).

Communication manager 620 may communicate with a base station using at least a reception beam having a first reception beam configuration and communicate with the base station using the second reception beam configuration.

Trigger information manager 625 may receive beam trigger information including a refinement schedule from the base station, the refinement schedule indicating a time for modifying reception beam configurations. In some cases, the refinement schedule indicates at least a portion of a slot for modifying reception beam configurations.

Beam switching manager 630 may identify a second reception beam configuration based on the beam trigger information, switch from the first reception beam configuration to the second reception beam configuration at the time based on the identifying, and transmit a message to the base station indicating that the first reception beam configuration has been switched to the second reception beam configuration. In some cases, a transmission beam configuration of a transmission beam of the base station remains the same during the switching. In some cases, the second reception beam configuration is switched by the UE based on data stored by the UE exclusive of data stored at the base station. In some cases, the message is transmitted before the UE transmits a channel state feedback report associated with the second reception beam configuration.

Beam switching manager 630 may determine that CSF for the second reception beam configuration is unknown at the time of switching from the first reception beam configuration to the second reception beam configuration. Beam switching manager 630 may determine that a beam refinement reference signal (BRRS) is unavailable for measuring channel state characteristics, wherein switching from the first reception beam configuration to the second reception beam configuration. Beam switching manager 630 may identify a trigger event indicated by the beam trigger information, wherein identifying the second reception beam is based at least in part on identifying the trigger event. Beam switching manager 630 may identify channel state feedback (CSF) of the first reception beam configuration and the second reception beam configuration based at least in part on a beam reference signal received from the base station, wherein identifying the second reception beam is based at least in part on identifying CSF of the first reception beam configuration and the second reception beam configuration.

Beam reference signal manager 635 may identify one or more beam reference signals received before the time, where identifying the second reception beam configuration is based on the one or more beam reference signals and identify a reception beam performance parameter based on a beam reference signal received from the base station before the time indicated by the refinement schedule, where identifying the second reception beam configuration is based on the reception beam performance parameter.

Beam state information manager 640 may receive beam state information of a transmission beam based from the base station, where identifying the second reception beam configuration is based on the beam state information.

Figure 7:
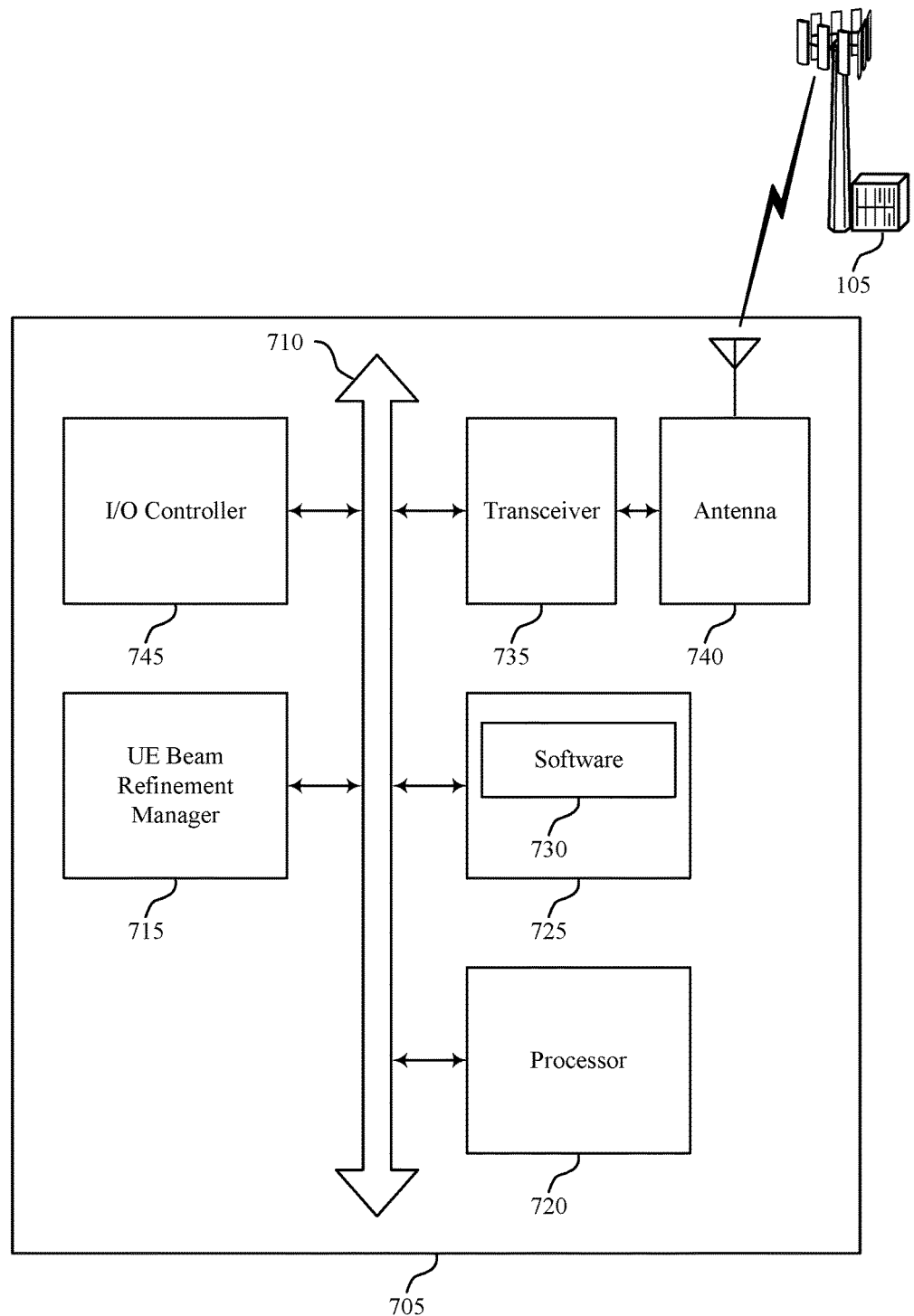
FIG. 7 illustrates a block diagram of a system including a UE that supports techniques for reception beam refinement in accordance with aspects of the present disclosure.

FIG. 7 shows a diagram of a system 700 including a device 705 that supports techniques for reception beam refinement in accordance with aspects of the present disclosure. Device 705 may be an example of or include the components of wireless device 405, wireless device 505, or a UE 115 as described above, e.g., with reference to FIGS. 1, 4 and 5. Device 705 may include components for bi-directional voice and data communications including components for transmitting and receiving communications, including UE beam refinement manager 715, processor 720, memory 725, software 730, transceiver 735, antenna 740, and I/O controller 745. These components may be in electronic communication via one or more busses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting techniques for reception beam refinement).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware and/or software operation such as the interaction with peripheral components or devices.

Software 730 may include code to implement aspects of the present disclosure, including code to support techniques for reception beam refinement. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
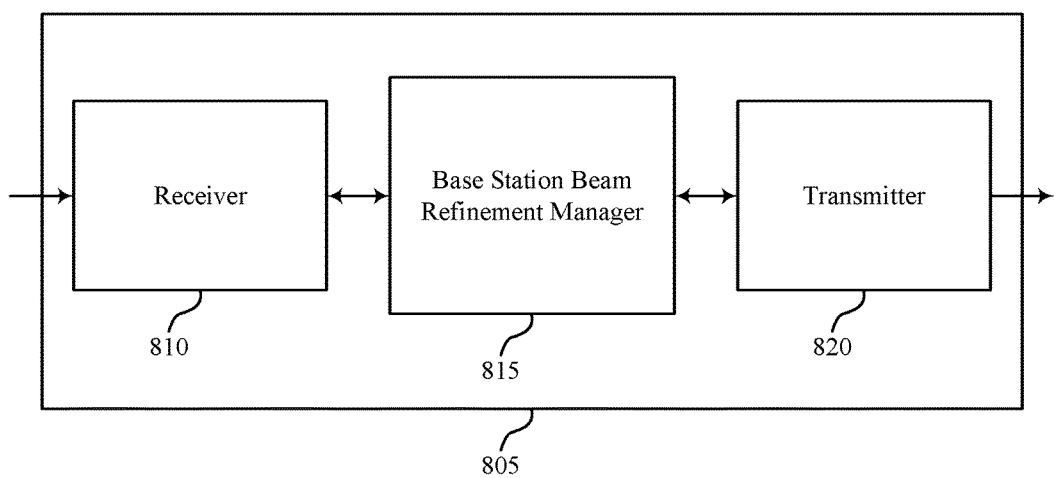
FIGS. 8 through 10 show block diagrams of a device that supports techniques for reception beam refinement in accordance with aspects of the present disclosure.

FIG. 8 shows a block diagram 800 of a wireless device 805 that supports techniques for reception beam refinement in accordance with aspects of the present disclosure. Wireless device 805 may be an example of aspects of a base station 105 as described with reference to FIG. 1. Wireless device 805 may include receiver 810, base station beam refinement manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to techniques for reception beam refinement, etc.). Information may be passed on to other components of the device. The receiver 810 may be an example of aspects of the transceiver 1135 described with reference to FIG. 11. The receiver 810 may utilize a single antenna or a set of antennas.

Base station beam refinement manager 815 may be an example of aspects of the base station beam refinement manager 1115 described with reference to FIG. 11. Base station beam refinement manager 815 and/or at least some of its various sub-components may be implemented in hardware, software executed by a processor, firmware, or any combination thereof. If implemented in software executed by a processor, the functions of the base station beam refinement manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station beam refinement manager 815 and/or at least some of its various sub-components may be physically located at various positions, including being distributed such that portions of functions are implemented at different physical locations by one or more physical devices. In some examples, base station beam refinement manager 815 and/or at least some of its various sub-components may be a separate and distinct component in accordance with various aspects of the present disclosure. In other examples, base station beam refinement manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station beam refinement manager 815 may communicate with a UE using a serving beam, the serving beam including a transmission beam having a transmission beam configuration and a reception beam having a reception beam configuration, transmit beam trigger information including a refinement schedule to the UE, the refinement schedule indicating a time for modifying the reception beam configuration, and initiate a procedure, at the time, to prevent link degradation between a reception beam configuration switching event and receipt of a channel state feedback report generated.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
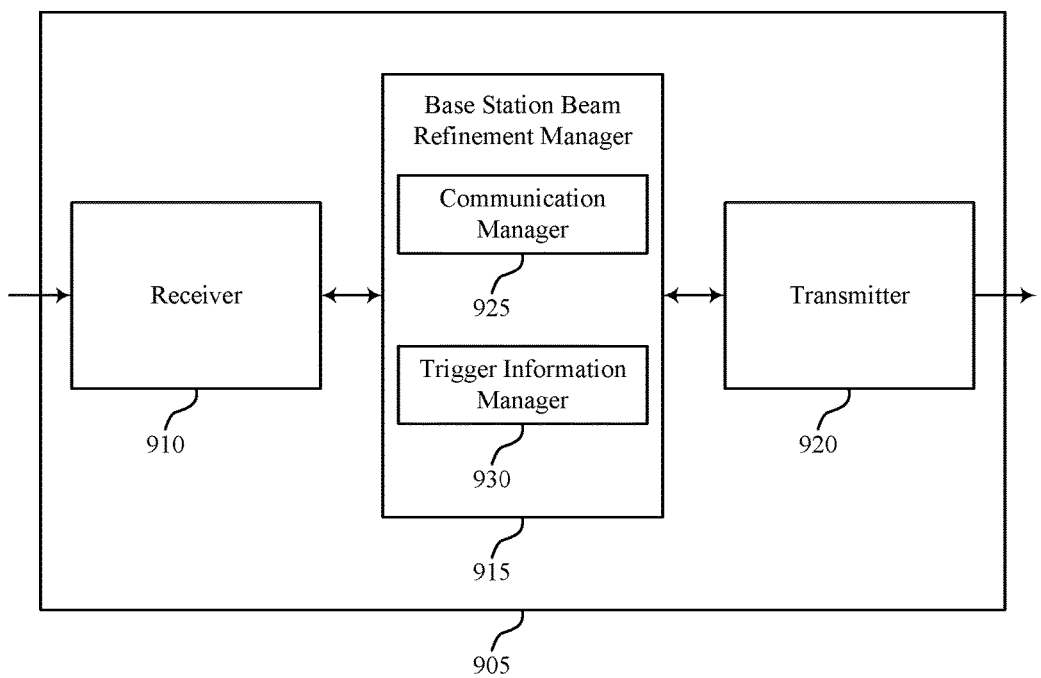

FIG. 9 shows a block diagram 900 of a wireless device 905 that supports techniques for reception beam refinement in accordance with aspects of the present disclosure. Wireless device 905 may be an example of aspects of a wireless device 805 or a base station 105 as described with reference to FIGS. 1 and 8. Wireless device 905 may include receiver 910, base station beam refinement manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to techniques for reception beam refinement, etc.). Information may be passed on to other components of the device. The receiver 910 may be an example of aspects of the transceiver 1135 described with reference to FIG. 11. The receiver 910 may utilize a single antenna or a set of antennas.

Base station beam refinement manager 915 may be an example of aspects of the base station beam refinement manager 1115 described with reference to FIG. 11. Base station beam refinement manager 915 may also include communication manager 925 and trigger information manager 930.

Communication manager 925 may communicate with a UE using a serving beam, the serving beam including a transmission beam having a transmission beam configuration and a reception beam having a reception beam configuration and initiate a procedure, at the time, to prevent link degradation between a reception beam configuration switching event and receipt of a channel state feedback report generated. In some cases, the transmission beam configuration of the transmission beam remains the same during the modification to reception beam configurations. In some cases, the UE a new reception beam configuration at the time based on data stored by the UE exclusive of data stored at the base station.

Trigger information manager 930 may transmit beam trigger information including a refinement schedule to the UE, the refinement schedule indicating a time for modifying the reception beam configuration.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
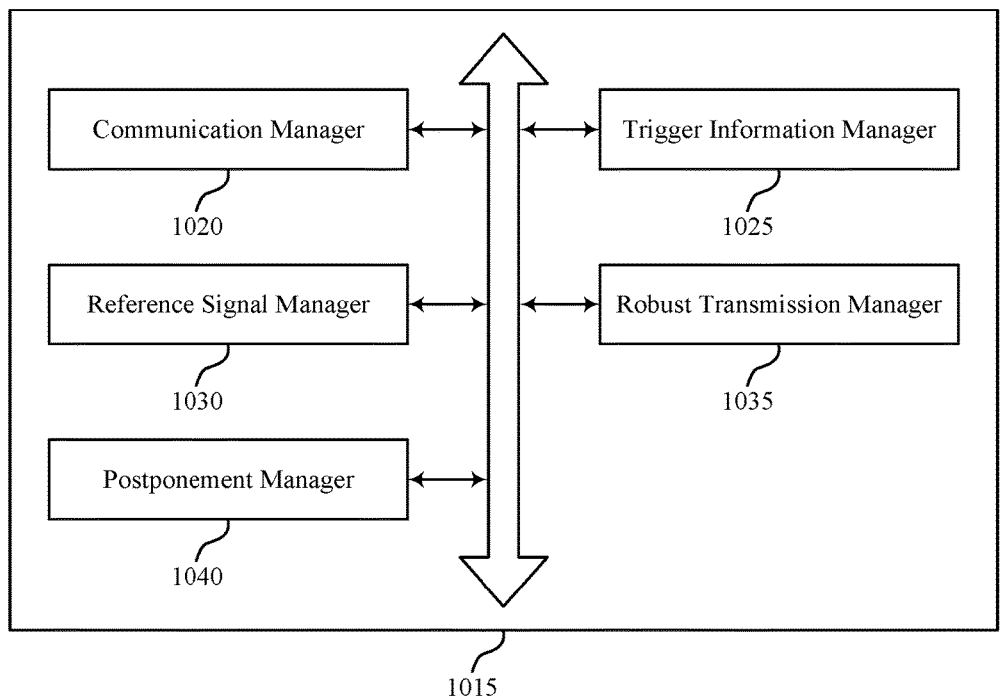

FIG. 10 shows a block diagram 1000 of a base station beam refinement manager 1015 that supports techniques for reception beam refinement in accordance with aspects of the present disclosure. The base station beam refinement manager 1015 may be an example of aspects of a base station beam refinement manager 1115 described with reference to FIGS. 8, 9, and 11. The base station beam refinement manager 1015 may include communication manager 1020, trigger information manager 1025, reference signal manager 1030, robust transmission manager 1035, and postponement manager 1040. Each of these modules may communicate, directly or indirectly, with one another (e.g., via one or more buses).

Communication manager 1020 may communicate with a UE using a serving beam, the serving beam including a transmission beam having a transmission beam configuration and a reception beam having a reception beam configuration and initiate a procedure, at the time, to prevent link degradation between a reception beam configuration switching event and receipt of a channel state feedback report generated. In some cases, the transmission beam configuration of the transmission beam remains the same during the modification to reception beam configurations. In some cases, the UE a new reception beam configuration at the time based on data stored by the UE exclusive of data stored at the base station.

Trigger information manager 1025 may transmit beam trigger information including a refinement schedule to the UE, the refinement schedule indicating a time for modifying the reception beam configuration. Trigger information manager 1025 may identify a trigger event indicated by the beam trigger information, wherein initiating the procedure is based at least in part on identifying the trigger event.

Reference signal manager 1030 may schedule a channel state information reference signal based on the beam trigger information. In some cases, the scheduling may be part of initiating a link maintenance procedure by the base station.

Robust transmission manager 1035 may transmit data to the UE using a robust transmission scheme before receiving the channel state feedback report from the UE based on the beam trigger information. In some cases, the transmitting data using the robust transmission scheme may be part of initiating a link maintenance procedure by the base station.

Postponement manager 1040 may postpone a data transmission to the UE until after the channel state feedback report is received from the UE based on the beam trigger information, the channel state feedback report being generated based on a new reception beam configuration different from an original reception beam configuration. In some cases, the postponing may be part of initiating a link maintenance procedure by the base station.

Figure 11:
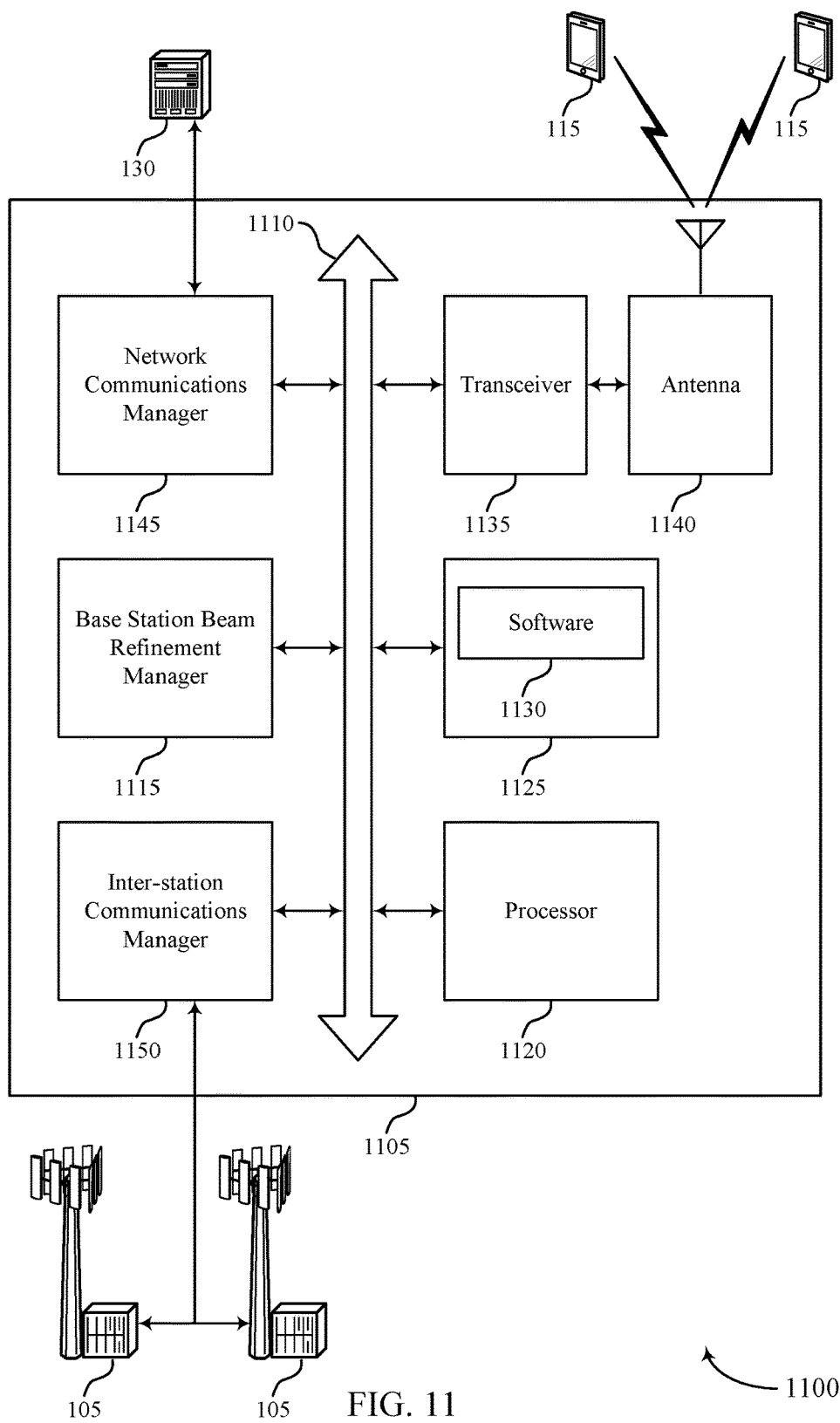
FIG. 11 illustrates a block diagram of a system including a base station that supports techniques for reception beam refinement in accordance with aspects of the present disclosure.

FIG. 11 shows a diagram of a system 1100 including a device 1105 that supports techniques for reception beam refinement in accordance with aspects of the present disclosure. Device 1105 may be an example of or include the components of base station 105 as described above, e.g., with reference to FIG. 1. Device 1105 may include components for bi-directional voice and data communications including components for transmitting and receiving communications, including base station beam refinement manager 1115, processor 1120, memory 1125, software 1130, transceiver 1135, antenna 1140, network communications manager 1145, and inter-station communications manager 1150. These components may be in electronic communication via one or more busses (e.g., bus 1110). Device 1105 may communicate wirelessly with one or more UEs 115.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting techniques for reception beam refinement).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware and/or software operation such as the interaction with peripheral components or devices.

Software 1130 may include code to implement aspects of the present disclosure, including code to support techniques for reception beam refinement. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Inter-station communications manager 1150 may manage communications with other base station 105, and may include a controller or scheduler for controlling communications with UEs 115 in cooperation with other base stations 105. For example, the inter-station communications manager 1150 may coordinate scheduling for transmissions to UEs 115 for various interference mitigation techniques such as beamforming or joint transmission. In some examples, inter-station communications manager 1150 may provide an X2 interface within an Long Term Evolution (LTE)/LTE-A wireless communication network technology to provide communication between base stations 105.

Figure 12:
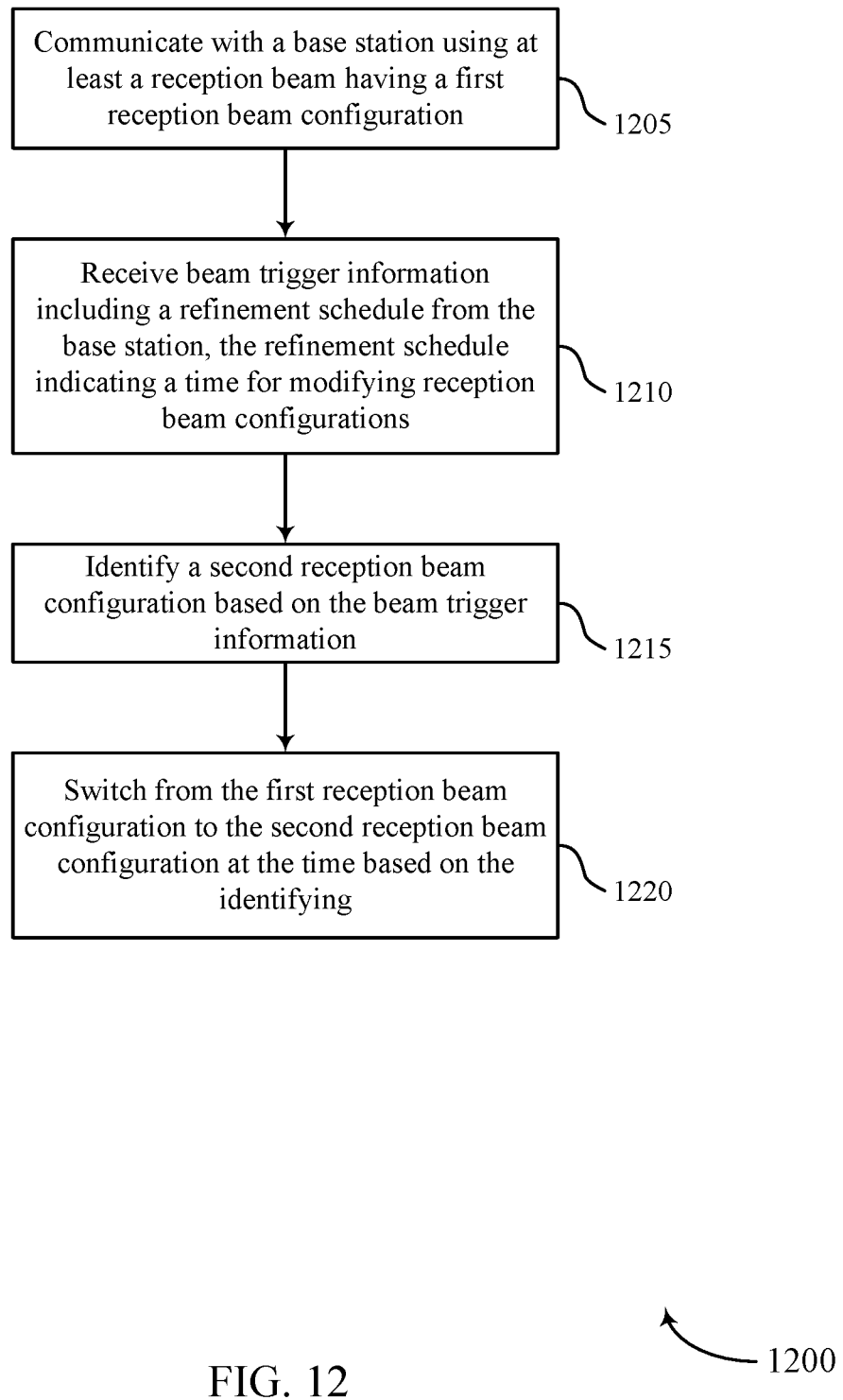
FIGS. 12 through 13 illustrate methods for techniques for reception beam refinement in accordance with aspects of the present disclosure.

FIG. 12 shows a flowchart illustrating a method 1200 for techniques for reception beam refinement in accordance with aspects of the present disclosure. The operations of method 1200 may be implemented by a UE 115 or its components as described herein. For example, the operations of method 1200 may be performed by a UE beam refinement manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At block 1205 the UE 115 may communicate with a base station using at least a reception beam having a first reception beam configuration. The operations of block 1205 may be performed according to the methods described with reference to FIGS. 1 through 3. In certain examples, aspects of the operations of block 1205 may be performed by a communication manager as described with reference to FIGS. 4 through 7.

At block 1210 the UE 115 may receive beam trigger information including a refinement schedule from the base station, the refinement schedule indicating a time for modifying reception beam configurations. The operations of block 1210 may be performed according to the methods described with reference to FIGS. 1 through 3. In certain examples, aspects of the operations of block 1210 may be performed by a trigger information manager as described with reference to FIGS. 4 through 7.

At block 1215 the UE 115 may identify a second reception beam configuration based at least in part on the beam trigger information. The operations of block 1215 may be performed according to the methods described with reference to FIGS. 1 through 3. In certain examples, aspects of the operations of block 1215 may be performed by a beam switching manager as described with reference to FIGS. 4 through 7.

At block 1220 the UE 115 may switch from the first reception beam configuration to the second reception beam configuration at the time based at least in part on the identifying. The operations of block 1220 may be performed according to the methods described with reference to FIGS. 1 through 3. In certain examples, aspects of the operations of block 1220 may be performed by a beam switching manager as described with reference to FIGS. 4 through 7.

Figure 13:
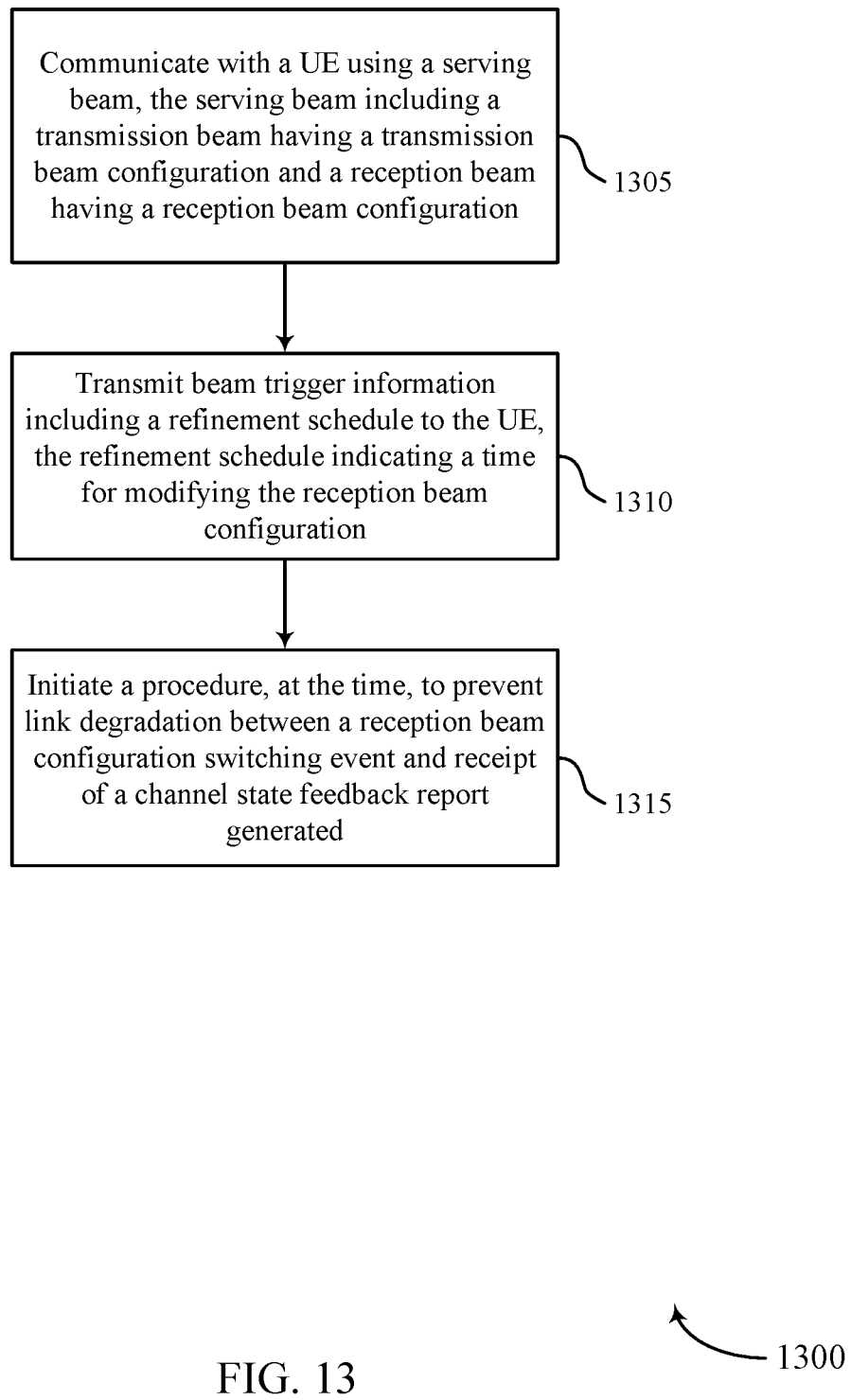

FIG. 13 shows a flowchart illustrating a method 1300 for techniques for reception beam refinement in accordance with aspects of the present disclosure. The operations of method 1300 may be implemented by a base station 105 or its components as described herein. For example, the operations of method 1300 may be performed by a base station beam refinement manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At block 1305 the base station 105 may communicate with a UE using a serving beam, the serving beam including a transmission beam having a transmission beam configuration and a reception beam having a reception beam configuration. The operations of block 1305 may be performed according to the methods described with reference to FIGS. 1 through 3. In certain examples, aspects of the operations of block 1305 may be performed by a communication manager as described with reference to FIGS. 8 through 11.

At block 1310 the base station 105 may transmit beam trigger information including a refinement schedule to the UE, the refinement schedule indicating a time for modifying the reception beam configuration. The operations of block 1310 may be performed according to the methods described with reference to FIGS. 1 through 3. In certain examples, aspects of the operations of block 1310 may be performed by a trigger information manager as described with reference to FIGS. 8 through 11.

At block 1315 the base station 105 may initiate a procedure, at the time, to prevent link degradation between a reception beam configuration switching event and receipt of a channel state feedback report generated for the new serving beam after the reception beam refinement event. The operations of block 1315 may be performed according to the methods described with reference to FIGS. 1 through 3. In certain examples, aspects of the operations of block 1315 may be performed by a communication manager as described with reference to FIGS. 8 through 11.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   communicating with a base station using at least a reception beam having a first reception beam configuration;
   receiving beam trigger information including a refinement schedule from the base station, the refinement schedule indicating a time for modifying reception beam configurations;
   identifying a second reception beam configuration based at least in part on the beam trigger information; and
   switching from the first reception beam configuration to the second reception beam configuration at the time based at least in part on the identifying.

2. The method of claim 1, wherein:
   a transmission beam configuration of a transmission beam of the base station remains the same during the switching.

3. The method of claim 1, further comprising:
   identifying one or more beam reference signals received before the time, wherein identifying the second reception beam configuration is based at least in part on the one or more beam reference signals.

4. The method of claim 1, further comprising:
   identifying a reception beam performance parameter based at least in part on a beam reference signal received from the base station before the time indicated by the refinement schedule, wherein identifying the second reception beam configuration is based at least in part on the reception beam performance parameter.

5. The method of claim 1, further comprising:
   communicating with the base station using the second reception beam configuration.

6. The method of claim 1, wherein:
the second reception beam configuration is switched by the UE based at least in part on data stored by the UE exclusive of data stored at the base station.

7. The method of claim 1, further comprising:
identifying a trigger event indicated by the beam trigger information, wherein identifying the second reception beam is based at least in part on identifying the trigger event.

8. The method of claim 1, further comprising:
identifying channel state feedback (CSF) of the first reception beam configuration and the second reception beam configuration based at least in part on a beam reference signal received from the base station, wherein identifying the second reception beam is based at least in part on identifying CSF of the first reception beam configuration and the second reception beam configuration.

9. A method for wireless communication, comprising:
communicating with a user equipment (UE) using a serving beam, the serving beam including a transmission beam having a transmission beam configuration and a reception beam having a reception beam configuration;
transmitting beam trigger information including a refinement schedule to the UE, the refinement schedule indicating a time for modifying the reception beam configuration; and
initiating a procedure, at the time, to prevent link degradation between a reception beam configuration switching event and receipt of a channel state feedback report generated.

10. The method of claim 9, wherein:
the transmission beam configuration of the transmission beam remains the same during reception beam switching.

11. The method of claim 9, wherein:
initiating the procedure comprises: scheduling a channel state information reference signal based at least in part on the beam trigger information.

12. The method of claim 9, wherein:
initiating the procedure comprises: transmitting data to the UE using a robust transmission scheme before receiving the channel state feedback report from the UE based at least in part on the beam trigger information.

13. The method of claim 9, wherein:
initiating the procedure comprises: postponing a data transmission to the UE until after the channel state feedback report is received from the UE based at least in part on the beam trigger information, the channel state feedback report being generated based at least in part on a new reception beam configuration different from a previous reception beam configuration.

14. The method of claim 9, wherein:
the UE new reception beam configuration at the time is based at least in part on data stored by the UE exclusive of data stored at the base station.

15. The method of claim 9, further comprising:
identifying a trigger event indicated by the beam trigger information, wherein initiating the procedure is based at least in part on identifying the trigger event.

16. An apparatus for wireless communication, in a system comprising:
a processor;
memory in electronic communication with the processor; and
instructions stored in the memory and operable, when executed by the processor, to cause the apparatus to:
communicate with a base station using at least a reception beam having a first reception beam configuration;
receive beam trigger information including a refinement schedule from the base station, the refinement schedule indicating a time for modifying reception beam configurations;
identify a second reception beam configuration based at least in part on the beam trigger information; and
switch from the first reception beam configuration to the second reception beam configuration at the time based at least in part on the identifying.

17. The apparatus of claim 16, wherein:
a transmission beam configuration of a transmission beam of the base station remains the same during the switching.

18. The apparatus of claim 16, wherein the instructions are further executable by the processor to cause the apparatus to:
identify one or more beam reference signals received before the time, wherein identifying the second reception beam configuration is based at least in part on the one or more beam reference signals.

19. The apparatus of claim 16, wherein the instructions are further executable by the processor to:
identify a reception beam performance parameter based at least in part on a beam reference signal received from the base station before the time indicated by the refinement schedule, wherein identifying the second reception beam configuration is based at least in part on the reception beam performance parameter.

20. The apparatus of claim 16, wherein the instructions are further executable by the processor to cause the apparatus to:
communicate with the base station using the second reception beam configuration.

21. The apparatus of claim 16, wherein:
the second reception beam configuration is switched by the UE based at least in part on data stored by the UE exclusive of data stored at the base station.

22. The apparatus of claim 16, wherein the instructions are further executable by the processor to cause the apparatus to:
identify a trigger event indicated by the beam trigger information, wherein identifying the second reception beam is based at least in part on identifying the trigger event.

23. The apparatus of claim 16, wherein the instructions are further executable by the processor to cause the apparatus to:
identify channel state feedback (CSF) of the first reception beam configuration and the second reception beam configuration based at least in part on a beam reference signal received from the base station, wherein identifying the second reception beam is based at least in part on identifying CSF of the first reception beam configuration and the second reception beam configuration.

24. An apparatus for wireless communication, in a system comprising:
a processor;
memory in electronic communication with the processor; and
instructions stored in the memory and operable, when executed by the processor, to cause the apparatus to:

communicate with a user equipment (UE) using a serving beam, the serving beam including a transmission beam having a transmission beam configuration and a reception beam having a reception beam configuration;

transmit beam trigger information including a refinement schedule to the UE, the refinement schedule indicating a time for modifying the reception beam configuration; and initiate a procedure, at the time, to prevent link degradation between a reception beam configuration switching event and receipt of a channel state feedback report generated.

25. The apparatus of claim 24, wherein:

the transmission beam configuration of the transmission beam remains the same during the modification to reception beam configurations.

26. The apparatus of claim 24, wherein:

initiating the procedure comprises: scheduling a channel state information reference signal based at least in part on the beam trigger information.

27. The apparatus of claim 24, wherein:

initiating the procedure comprises: transmitting data to the UE using a robust transmission scheme before receiving the channel state feedback report from the UE based at least in part on the beam trigger information.

28. The apparatus of claim 24, wherein:

initiating the procedure comprises: postponing a data transmission to the UE until after the channel state feedback report is received from the UE based at least in part on the beam trigger information, the channel state feedback report being generated based at least in part on a new reception beam configuration different from a previous reception beam configuration.

29. The apparatus of claim 24, wherein:

the UE a new reception beam configuration at the time based at least in part on data stored by the UE exclusive of data stored at the base station.

30. The apparatus of claim 24, wherein the instructions are further executable by the processor to cause the apparatus to:

identify a trigger event indicated by the beam trigger information, wherein initiating the procedure is based at least in part on identifying the trigger event.

* * * * *